US010137883B2

(12) United States Patent
Chung et al.

(10) Patent No.: US 10,137,883 B2
(45) Date of Patent: Nov. 27, 2018

(54) ACTIVE VIBRATION REDUCTION CONTROL APPARATUS FOR HYBRID ELECTRIC VEHICLE AND METHOD THEREOF

(71) Applicant: HYUNDAI MOTOR COMPANY, Seoul (KR)

(72) Inventors: Tae Young Chung, Hwaseong-si (KR); Hyung Bin Ihm, Seoul (KR); Hyung Souk Kang, Seoul (KR)

(73) Assignee: Hyundai Motor Company, Seoul (KR)

( * ) Notice: Subject to any disclaimer, the term of this patent is extended or adjusted under 35 U.S.C. 154(b) by 35 days.

(21) Appl. No.: 15/366,383

(22) Filed: Dec. 1, 2016

(65) Prior Publication Data

US 2018/0009430 A1    Jan. 11, 2018

(30) Foreign Application Priority Data

Jul. 11, 2016    (KR) .................... 10-2016-0087514

(51) Int. Cl.
*B60L 9/00*      (2006.01)
*B60W 20/15*      (2016.01)
(Continued)

(52) U.S. Cl.
CPC ............... *B60W 20/15* (2016.01); *B60K 1/02* (2013.01); *B60K 6/48* (2013.01); *B60W 10/06* (2013.01);
(Continued)

(58) Field of Classification Search
None
See application file for complete search history.

(56) References Cited

U.S. PATENT DOCUMENTS 7,633,257 B2    12/2009    Sakamoto et al.
2007/0101965 A1    5/2007    Asahara et al.
(Continued)

FOREIGN PATENT DOCUMENTS

DE    10 2015 110858 A1    6/2016
EP          3031649 A1    6/2016
(Continued)

OTHER PUBLICATIONS

Korean Office Action issued in Application No. 10-2016-0087514 dated Apr. 10, 2017.
(Continued)

*Primary Examiner* — Bhavesh V Amin
(74) *Attorney, Agent, or Firm* — McDermott Will & Emery LLP

(57) ABSTRACT

An active vibration reduction control apparatus for a hybrid electric vehicle includes: a reference signal generator generating a reference signal and a first phase based on a first rotational angle of a first motor; a vibration extractor extracting a vibration signal from a second motor; a coefficient determiner determining a filter coefficient which minimizes a phase difference between the reference signal and the vibration signal; a phase determiner detecting a second phase which corresponds to the phase difference using a first speed signal of the first motor and the filter coefficient; a phase deviation amount detector detecting a third phase for compensating for a phase delay; and a synchronization signal generator generating an antiphase signal of a shape of an actual vibration in order to determine a compensating force of the first motor.

18 Claims, 10 Drawing Sheets

(51) Int. Cl.
  *B60K 1/02*      (2006.01)
  *B60K 6/48*      (2007.10)
  *B60W 30/20*     (2006.01)
  *B60W 10/06*     (2006.01)
  *B60W 10/08*     (2006.01)
  *B60W 50/00*         (2006.01)

(52) U.S. Cl.
  CPC ............ *B60W 10/08* (2013.01); *B60W 30/20* (2013.01); *B60K 2006/4825* (2013.01); *B60W 2030/206* (2013.01); *B60W 2050/0039* (2013.01); *B60W 2050/0042* (2013.01); *B60W 2050/0052* (2013.01); *B60W 2050/0054* (2013.01); *B60W 2400/00* (2013.01); *B60W 2510/06* (2013.01); *B60W 2510/081* (2013.01); *B60W 2710/083* (2013.01); *Y02T 10/6221* (2013.01); *Y02T 10/6252* (2013.01); *Y10S 903/906* (2013.01); *Y10S 903/951* (2013.01)

(56) References Cited

U.S. PATENT DOCUMENTS

2007/0222407 A1    9/2007    Sakamoto et al.
2012/0239237 A1    9/2012    Hashimoto
2016/0159340 A1*   6/2016    Chung .................. B60W 20/17
                                                              701/22
2016/0185334 A1    6/2016    Yoo et al.
2018/0009430 A1*   1/2018    Chung .................. B60W 20/15

FOREIGN PATENT DOCUMENTS

| JP | H11-089008 A      | 3/1999  |
| JP | 2007-126073 A     | 5/2007  |
| KR | 10-2010-0064603 A | 6/2010  |
| KR | 10-1000410 B1     | 12/2010 |
| KR | 10-2013-0001481 A | 1/2013  |
| KR | 10-1619663 B1     | 5/2016  |

OTHER PUBLICATIONS

Extended European Search Report issued in Application No. 16201251.2 dated Jun. 19, 2017.
Korean Notice of Allowance issued in Application No. 10-2016-0087514 dated Sep. 1, 2017.

* cited by examiner

| PHASE | 0 | 10 | ... ... ... ... | 360 |
|---|---|---|---|---|
| AMPLITUDE | 0.2 | 0.5 | ... ... ... ... | 0 |

SHAPE OF ACTUAL VIBRATION

ACTIVE VIBRATION REDUCTION CONTROL APPARATUS FOR HYBRID ELECTRIC VEHICLE AND METHOD THEREOF

CROSS-REFERENCE TO RELATED APPLICATION

This application is based on and claims the benefit of priority to Korean Patent Application No. 10-2016-0087514, filed on Jul. 11, 2016 in the Korean Intellectual Property Office, the disclosure of which is incorporated herein in its entirety by reference.

TECHNICAL FIELD

The present disclosure relates to an active vibration reduction control apparatus for a hybrid electric vehicle and a method thereof, and more particularly, to an active vibration reduction control apparatus for a hybrid electric vehicle capable of actively reducing vibration generated by an explosion of an engine, and a method thereof.

BACKGROUND

An engine generates torque by combustion pressure during an explosion stroke of a cylinder. Torque of the engine generally includes a vibration component which is proportional to the number of explosions of the cylinder per a shaft rotation due to a rapid variation of the combustion pressure. Such vibration component is transferred to a vehicle body through an engine mount and a drive shaft, which causes vibration and noise, and degrades ride comfort.

In order to solve the above-mentioned problems, an electrification vehicle including an electric motor such as an eco-friendly vehicle, and the like uses a method of actively reducing vibration generated in a powertrain using a motor, and particularly, uses a method for reducing vibration by measuring a vibration component transferred through the powertrain at the time of an explosion stroke of an internal combustion engine and applying antiphase torque for the vibration to a motor mounted in the powertrain. Here, a reference signal of the antiphase torque mainly uses a sine wave form, and a coefficient of an active filter is determined so that error between the generated vibration and the reference sine wave is the minimum. Here, since the reference signal (see 110 in FIG. 1) of the antiphase torque is different from a vibration shape (see 120 in FIG. 1) by an actual explosion of the engine, a phase difference exists between a peak of an actual vibration and a peak of the reference sine wave, which degrades performance of a vibration reduction control.

SUMMARY

The present disclosure has been made to solve the above-mentioned problems occurring in the prior art while advantages achieved by the prior art are maintained intact.

An aspect of the present disclosure provides an active vibration reduction control apparatus for a hybrid electric vehicle and a method thereof capable of improving phase synchronization performance between actual vibration and a reference signal by generating the reference signal of antiphase torque in a shape of the actual vibration, not in a sine wave of a sine wave form in order to determine compensating force of a motor of an antiphase, and actively and effectively reducing vibration generated by an explosion of an engine by directly adjusting a phase in a frequency domain, not in a time domain.

According to an exemplary embodiment of the present disclosure, an active vibration reduction control apparatus for a hybrid electric vehicle includes: a reference signal generator generating a reference signal and a first phase based on a first rotational angle of a first motor which is coupled to one side of an engine; a vibration extractor extracting a vibration signal from a second motor which is coupled to another side of the engine; a coefficient determiner determining a filter coefficient which minimizes a phase difference between the reference signal and the vibration signal; a phase determiner detecting a second phase corresponding to the phase difference between the reference signal and the vibration signal using a first speed signal of the first motor and the filter coefficient; a phase deviation amount detector detecting a third phase for compensating for a phase delay using the speed signal of the first motor; and a synchronization signal generator generating an antiphase signal of a shape of an actual vibration, using the first phase, the second phase, or the third phase, in order to determine compensating force of the first motor.

The active vibration reduction control apparatus may further include a torque generator generating a vibration reduction torque by generating an antiphase torque by multiplying a reference torque with the antiphase signal and then summing the generated antiphase torque and an instruction torque.

The synchronization signal generator may include: a phase synthesizer generating a phase synthesizing signal corresponding to the shape of the actual vibration according to a phase obtained by adding the third phase to a result obtained by subtracting the second phase from the first phase; and an antiphase signal generator generating an antiphase signal of the phase synthesizing signal.

The synchronization signal generator may generate the antiphase signal of the shape of the actual vibration for a phase determined using the first phase, the second phase, or the third phase using a look-up table for signal amplitude for each of phase values. The synchronization signal generator may calculate signal amplitude corresponding to a detailed phase between the phase values of the look-up table using a linear interpolation method.

The synchronization signal generator may calculate and output the antiphase signal of the shape of the actual vibration using the first phase, the second phase, or the third phase, based on an engine or crank shaft torque model that is associated with suction, compression, explosion, and exhaust strokes of the engine.

The vibration extractor may include: a position measurer measuring a second rotational angle of the second motor; a speed calculator calculating a second speed signal by differentiating the second rotational angle measured by the position measurer; and a vibration extractor extracting a vibration signal by filtering the second speed signal.

The reference signal generator may include: a position measurer measuring the first rotational angle of the first motor; a calculator calculating a third rotational angle by multiplying the first rotational angle of the first motor measured by the position measurer with 2 as the second phase; and a reference signal generator generating the reference signal using the third rotational angle.

The phase determiner may include: a speed calculator calculating the first speed signal by differentiating the second rotational angle measured by the position measurer; and a phase determiner detecting the phase difference between the reference signal and the vibration signal using the speed signal calculated by the speed calculator and the determined filter coefficient.

The coefficient determiner may include: a filter coefficient updater; a variable filter filtering the reference signal generated by the reference signal generator using the filter coefficient updated by the filter coefficient updater; and a phase difference calculator calculating a phase difference between the reference signal generated by the reference signal generator and the vibration signal extracted by the vibration extractor, and the filter coefficient updater updates the filter coefficient so that the phase difference calculated by the phase difference calculator is minimized.

According to another exemplary embodiment of the present disclosure, an active vibration reduction control method for a hybrid electric vehicle includes steps of: generating a reference signal and a first phase based on a first rotational angle of a first motor which is coupled to one side of an engine; extracting a vibration signal from a second motor which is coupled to another side of the engine; determining a filter coefficient minimizing a phase difference between the reference signal and the vibration signal; detecting a second phase corresponding to the phase difference between the reference signal and the vibration signal using a first speed signal of the first motor and the filter coefficient; detecting a third phase for compensating for a phase delay using the speed signal of the first motor; and generating an antiphase signal of a shape of an actual vibration, not a sine wave, using the first phase, the second phase, or the third phase, in order to determine compensating force of the first motor.

The active vibration reduction control method may further include generating a vibration reduction torque by generating an antiphase torque by multiplying a reference torque with the antiphase signal and then summing the generated antiphase torque and an instruction torque.

The generating of the antiphase signal may include: generating a phase synthesizing signal corresponding to the shape of the actual vibration according to a phase obtained by adding the third phase to a result obtained by subtracting the second phase from the first phase; and generating an antiphase signal of the phase synthesizing signal.

The generating of the antiphase signal may include: generating the antiphase signal of the shape of the actual vibration for a phase determined using the first phase, the second phase, or the third phase using a look-up table for signal amplitude for each of phase values. In the generating of the antiphase signal, signal amplitude corresponding to a detailed phase between the phase values of the look-up table may be calculated using a linear interpolation method.

The generating of the antiphase signal may include: calculating and outputting the antiphase signal of the shape of the actual vibration using the first phase, the second phase, or the third phase, based on an engine or crank shaft torque model associated with suction, compression, explosion, and exhaust strokes of the engine.

The extracting of the vibration signal may include: measuring a second rotational angle of the second motor; calculating a second speed signal by differentiating the second rotational angle; and extracting a vibration signal by filtering the speed signal.

The generating of the reference signal and the first phase may include: measuring the first rotational angle of the first motor; calculating a third rotational angle by multiplying the first rotational angle of the first motor with 2 as the first phase; and generating a reference signal using the third rotational angle.

The detecting of the second phase may include: calculating the first speed signal by differentiating the first rotational angle of the first motor; and detecting a phase difference between the reference signal and the vibration signal using the speed signal and the filter coefficient as the second phase.

The determining of the filter coefficient may include: filtering, by a variable filter, the reference signal using the filter coefficient; calculating a phase difference between the reference signal and the vibration signal; and updating the filter coefficient to be provided to the variable filter so that the phase difference between the reference signal and the vibration signal is minimized.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
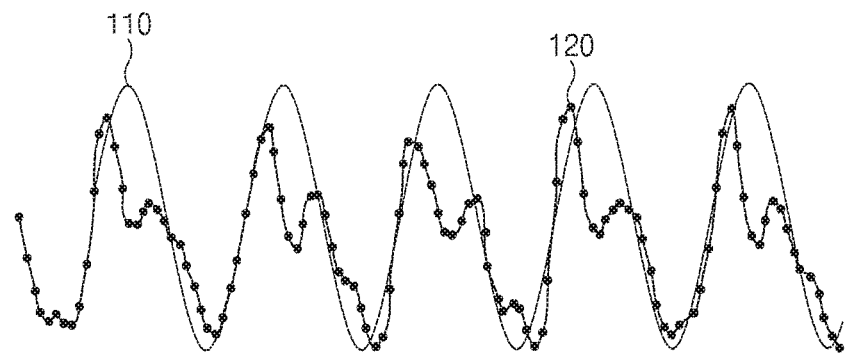
FIG. 1 is a view illustrating a vibration reduction method according to the related art using antiphase torque.

Hereinafter, the present disclosure will be described in detail with reference to the accompanying drawings. Here, like reference numerals denote like elements in the respective drawings. In addition, a detailed description of functions and/or configurations which are already known will be omitted. The contents disclosed below mainly describe portions necessary to understand operations according to various exemplary embodiments, and a description of elements which may obscure the gist of the description will be omitted. In addition, some components shown in the drawings may be exaggerated, omitted or schematically illustrated. The size of each component does not exactly reflect its real size and accordingly, the contents described in this specification are not limited by relative sizes or intervals of the components illustrated in the respective drawings.

Figure 2:
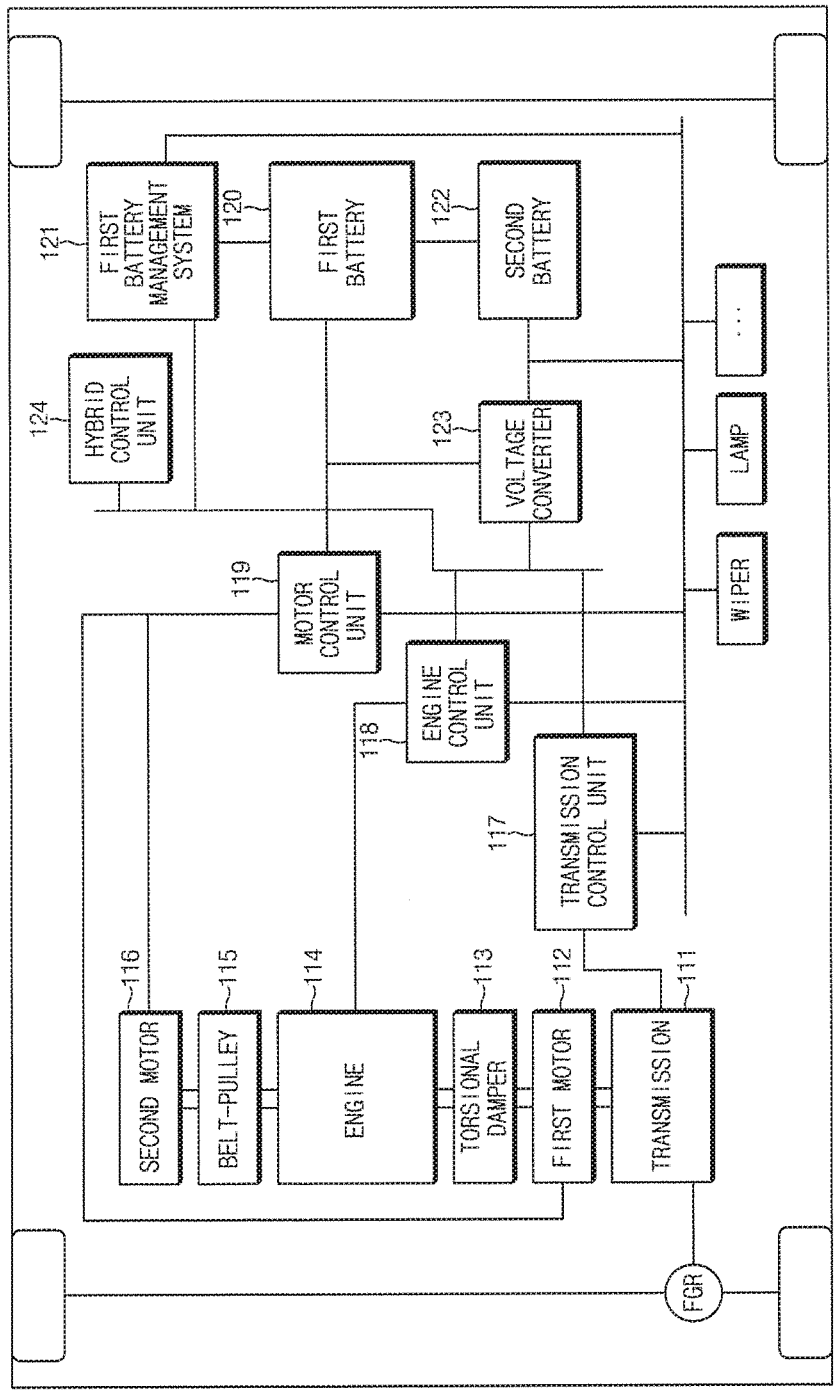
FIG. 2 is a view illustrating a hybrid electric vehicle to which an active vibration reduction control apparatus according to the present disclosure is applied.

FIG. 2 is a view illustrating a hybrid electric vehicle to which an active vibration reduction control apparatus according to the present disclosure is applied.

As illustrated in FIG. 2, a hybrid electric vehicle to which the present disclosure is applied is the hybrid electric vehicle of a transmission-mounted electric device (TMED) type in which an engine 114 and a first motor 112 are connected to each other through a torsional damper 113, and a powertrain of the hybrid electric vehicle includes a transmission 111, the first motor 112, the torsional damper 113, the engine 114, a belt-pulley 115, a second motor 116, a transmission control unit (TCU) 117, an engine control unit (ECU) 118, a motor control unit (MCU) (including an inverter) 119, a first battery 120, a first battery management system (BMS) 121, a second battery 122, a voltage converter 123, a hybrid control unit (HCU) 124.

Here, the first motor 112 is connected to the engine 114 through the torsional damper 113 and an engine clutch (not shown), and basically drives the vehicle based on a high voltage from the first battery 120, and supports a hybrid electric vehicle (HEV) mode driving and an electric vehicle (EV) mode driving by coupling or releasing the engine clutch according to driving force at the time of the drive and a regenerative breaking demand at the time of deceleration. In particular, the first motor 112 serves as the subject reducing vibration according to the present disclosure. That is, the first motor 112 prevents the vibration from being transferred to the transmission 111 stage. The second motor 116 is connected to the engine 114 through the belt-pulley 115, which is a connector, and charges the first battery 120 using power of the engine 114, or supplies power to the first motor 112. The first battery management system (BMS) 121 manages the first battery 120 supplying the high voltage. The second battery 122 supplies power to an electronic load. The voltage converter 123 converts a voltage of the first battery 120 into a rated voltage of the second battery 122. The hybrid control unit 124 performs an overall control of the vehicle such as determining a driving point of the vehicle, and the like. In addition, the hybrid control unit 124 is the top-level control unit performing a driving control of the respective control units, a setting of a hybrid drive mode, and the overall control of the vehicle. The respective control units are connected to each other through a high speed controller area network (CAN) communication line based on the hybrid control unit 124, which is the top-level control unit. Accordingly, a high-level control unit transfers a command to a low-level control unit while information is transmitted and received between the control units.

Hereinafter, an additional description will be provided to clearly understand the gist of the present disclosure.

An antiphase detection, which is a critical technology for an active vibration reduction control for a hybrid electric vehicle according to the present disclosure, is achieved using frequency response characteristics of a powertrain. The 13 vibration occurring by acting exciting force to the powertrain may be modeled into a system transfer function, an amplitude and phase relationship between input and output vibrations may be represented by a frequency response of the transfer function.

Figure 3:
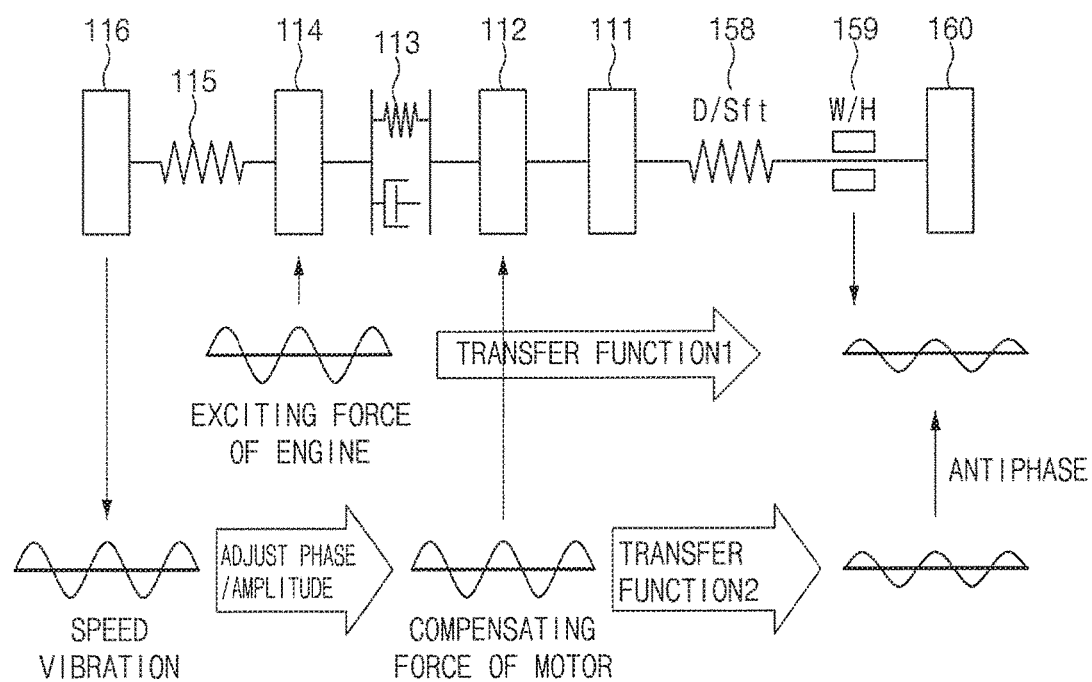
FIG. 3 is a view illustrating a concept of generating antiphase torque for a vibration reduction of a vehicle according to the present disclosure.

FIG. 3 is a view illustrating a concept of generating antiphase torque for a vibration reduction of a vehicle according to the present disclosure.

The exciting force occurring from the engine 114 is transferred to the respective elements such as the transmission 111, the second motor 116 (or a hybrid starter generator (HSG)), a drive shaft (DS) 158, a wheel house (WH) 159, and the like which are connected to the powertrain, to cause the vibration in the respective portions of the vehicle body 160. A separate transfer function exists for each of the respective transfer paths, and an amplitude and phase difference of the vibration of the respective portions are different from those of an exciting vibration source. The values of the amplitude and phase difference are determined according to parameters of a mechanical system such as the moment of inertia, rigidity, a damping coefficient, and the like. When the exciting force of the engine is transferred to a reduction target portion (e.g., the first motor 112), the vibration at the target portion is offset by adjusting the phase and the amplitude using speed vibration signal measured based on the second motor 116 to apply compensating force which is an antiphase for the exciting force of the engine to the target portion, thereby making it possible to reduce the vibration.

Since the vibration and the exciting force of the engine measured at a specific portion of the powertrain as illustrated in FIG. 2 or 3, and the vibration of the vibration reduction target portion each have a constant frequency response relationship, the antiphase of the target portion may be estimated using frequency response characteristics of the powertrain. Since a constant frequency response, that is, a phase and amplitude difference exists between a vibration component of the speed extracted by measuring speed by differentiating (or an observer) a position signal (e.g., a position of an HSG rotor) of the second motor 116 and then performing a filtering and the exciting force of the engine, and the constant frequency response exists from the exciting force of the engine to the vibration reduction target portion (e.g., the first motor), the constant frequency response relationship exits between the measured vibration signal and the target portion. In addition, since the constant frequency relationship also exists from generating force of the motor to the target portion, the constant frequency response relationship is consequently established between the extracted vibration signal and the compensating force to be generated by the target portion (e.g., the first motor) in order to reduce an antiphase vibration at the target portion.

In order to determine the compensating force of the first motor 112 which reduces actual vibration and is the vibration reduction target portion, the hybrid electric vehicle described above determines the compensating force of the antiphase for reducing the vibration by generating a reference signal synchronized to the vibration signal extracted from the speed signal of the second motor 116, and then performing an amplitude adjustment and a phase deviation according to pre-detected frequency characteristics of the transfer function of the powertrain. Here, the amplitude of the compensating force may also be determined by using engine torque provided by the engine control unit (ECU) 118. According to the present disclosure, phase synchronization performance between the actual vibration and the reference signal may be particularly improved by generating the antiphase signal in a shape of the actual vibration, not in a sine wave of a sine form used for a typical active vibration reduction technology based on phase information of the first motor 112.

The antiphase detection according to the present disclosure is achieved by using the frequency response of the transfer function of the powertrain, wherein the transfer function from a point to which a sensor capable of extracting the vibration is attached to a point targeted to reduce the vibration is used. An operation of the above-mentioned antiphase detection will be described. The sine wave following acting force transferred to a vibration measurement portion is estimated by extracting the vibration component of the sine wave form from the speed (or the position) information measured by the sensor and then generating the sine wave having the amplitude and phase adjusted as much as the frequency response of the transfer function of a corresponding path, that is, the amplitude response and the phase response. Next, as to the estimated sine wave, the first motor 112 generates power obtained by adjusting the amplitude and the phase of the estimated acting force and then reversing the adjusted amplitude and phase according to the transfer function to the vibration reduction target point, the vibration of the target point is offset. The operation of adjusting the antiphase according to the present disclosure does not use the filter in a time domain, and may be performed in a frequency domain through an operation of summing a phase for a position angle of the reference signal.

Figure 4:
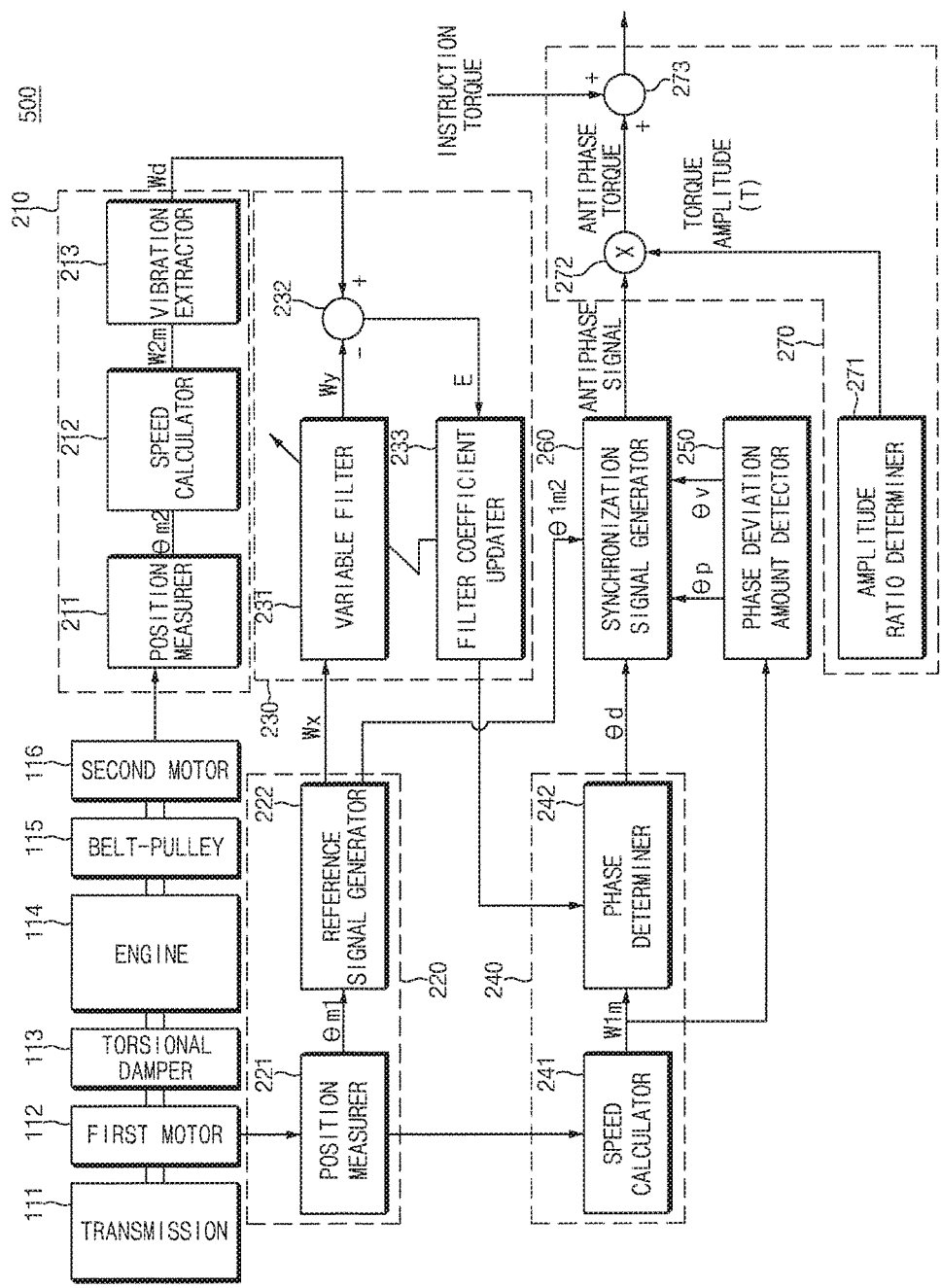
FIG. 4 is a view illustrating an active vibration reduction control apparatus for a hybrid electric vehicle according to an exemplary embodiment of the present disclosure.

FIG. 4 is a view illustrating an active vibration reduction control apparatus 500 for a hybrid electric vehicle according to an exemplary embodiment of the present disclosure.

As illustrated in FIG. 4, the active vibration reduction control apparatus 500 for a hybrid electric vehicle according to the present disclosure includes a vibration extractor 210, a reference signal generator 220, a coefficient determiner 230, a phase determiner 240, a phase deviation amount detector 250, a synchronization signal generator 260, and a torque generator 270. The respective components of the active vibration reduction control apparatus 500 for a hybrid electric vehicle 500 according to an exemplary embodiment of the present disclosure may be implemented by hardware such as a semiconductor processor, software such as an application program, or a combination thereof.

Figure 5:
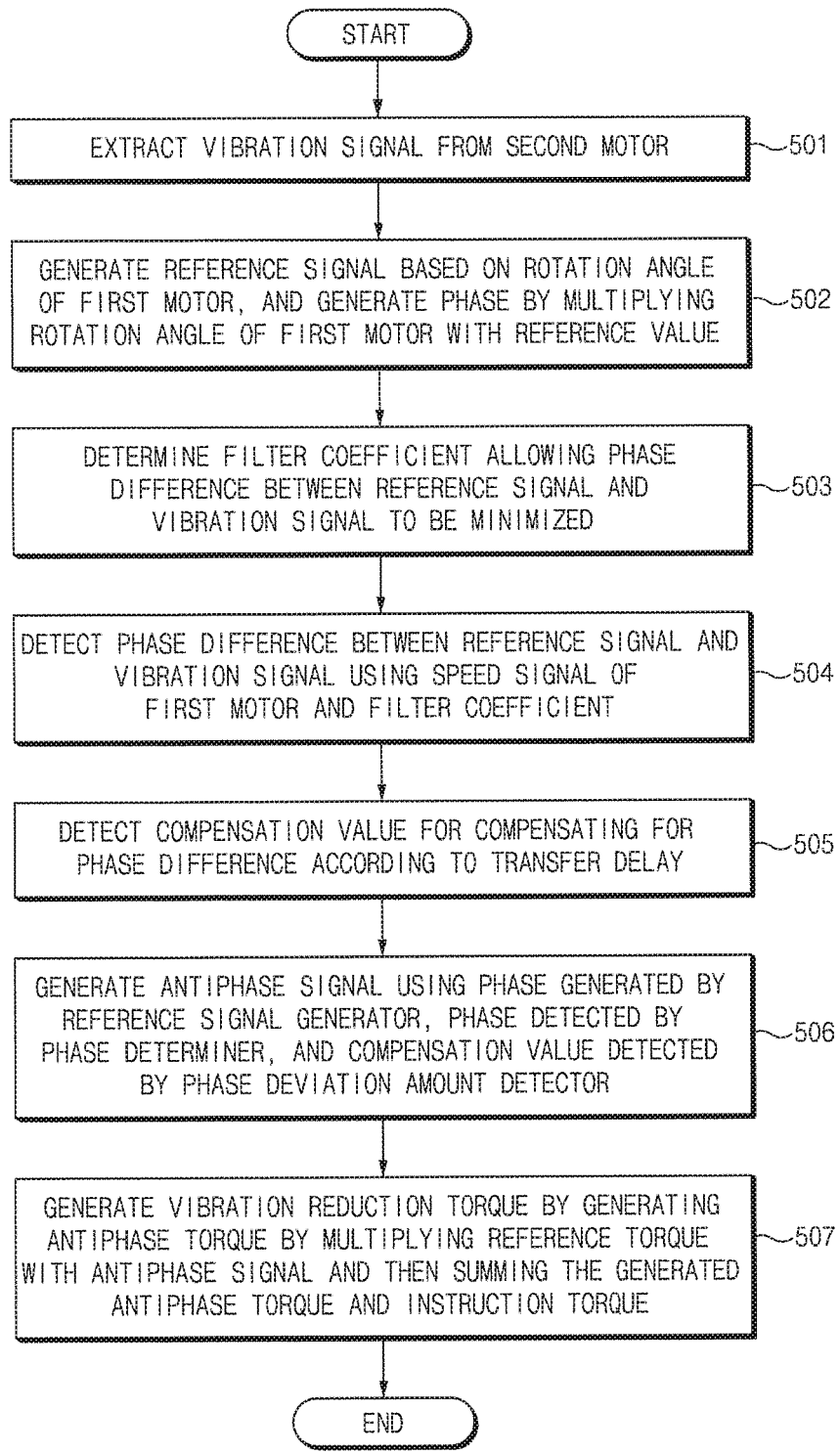
FIG. 5 is a flowchart illustrating an operation of the active vibration reduction control apparatus for a hybrid electric vehicle according to an exemplary embodiment of the present disclosure.

FIG. 5 is a flowchart illustrating an operation of the active vibration reduction control apparatus 500 for a hybrid electric vehicle according to an exemplary embodiment of the present disclosure.

First, the vibration extractor 210 extracts the vibration signal (vibration component) from the second motor 116 which is being operated (501). According to the present disclosure, when the torsional damper 113 is disposed between the first motor 112, which is the subject of reducing the vibration, and the engine 114 generating the vibration, the vibration generated by the explosion of the engine is significantly offset while passing through the torsional damper 113. As a result, since it is difficult to extract the vibration signal from the first motor 112, the vibration signal generated by the explosion of the engine is extracted from the second motor 116.

Such vibration extractor 210 includes a position measurer (resolver) 211 measuring a position (e.g., a rotation angle of the HSG rotor) (θm2) of a rotor within the second motor 116, a speed calculator 212 calculating a speed signal (W2m) by differentiating the rotation angle (θm2) measured by the position measurer 211, and a vibration extractor 213 extracting a vibration signal (Wd) by filtering the speed signal calculated by the speed calculator 212.

Here, the vibration extractor 213 may be implemented as a digital filter of a band-pass type passing only the vibration component generated by the explosion of the engine. In this case, a cutoff frequency of the digital filter may also be used by determining a desired region in advance, and may also be used by varying the cutoff frequency based on the number of turns of the engine. For example, since a four-cylinders and four strokes internal combustion engine generates two explosions when it is mechanically rotated once, an explosion component of a frequency which is two times of speed of revolution of the engine is observed, and the cutoff frequency may be determined by considering the observed explosion component.

Next, the reference signal generator 220 generates a reference signal (Wx) based on the rotation angle (phase) (θm1) of the first motor 112 (502). That is, the reference signal generator 200 generates a unit sine wave having amplitude of 1 as the reference signal. In addition, the reference signal generator 220 generates a result (e.g., two times of a period of the explosion of the engine, that is, the rotation angle of two times) (θ1m2) obtained by multiplying the rotation angle (θm1) of the first motor 112 with a reference value (502). Here, since the four-cylinders and four-strokes internal combustion engine in which the explosions of the number of two times are generated whenever a crank shaft is rotated once is described by way of example, 2 is multiplied, but if the internal combustion engine is different, the multiplying value is also varied. Such reference signal generator 220 includes a position measurer (resolver) 221 measuring the rotation angle (θm1) of the first motor 112, and a generator 222 generating the rotation angle (θ1m2) of two times and the reference signal (Wx) of the unit sine wave form having amplitude of 1 corresponding to the rotation angle (θm1) based on the rotation angle (θm1) measured by the position measurer 221.

Next, the coefficient determiner 230 determines a filter coefficient allowing a phase difference between the reference signal (Wx) generated by the reference signal generator 220 and the vibration signal (Wd) extracted by the vibration extractor 210 to be minimized (503). Here, the reference signal generated by the reference signal generator 220 and the vibration signal extracted by the Vibration extractor 210 have the same frequency as each other. Such a coefficient determiner 230 includes a variable filter 231, a phase difference calculator 232, and a filter coefficient updater 233. The coefficient determiner 230 of an adaptive filter form as described above may determine the filter coefficient which is close to the optimum so that error between two signals (Wd and Wx) is minimized.

The variable filter 231 of a finite impulse response (FIR) type or an infinite impulse response (IIR) type filters the reference signal (Wx) generated by the reference signal generator 220 using the filter coefficient updated by the filter coefficient updater 233. In this case, the filtering result (Wy) using the FIR filter is as the following Equation 1.

$$W_y = H(z)W_x, \; H(z) = b_1 z^{-1} + b_0 \quad \text{[Equation 1]}$$

Here, H(z) is the FIR filter of a function form having a variable of z. Although an exemplary embodiment of the present disclosure describes an example in which H(z) is a linear variable filer, a quadratic or more variable filter may also be used, as needed. The phase difference calculator 232 calculates a phase difference E between the filtering result (Wy) generated from the reference signal (Wx) and the vibration signal (Wd) extracted by the vibration extractor 210. The filter coefficient updater 233 calculates filter coefficients (b0, b1 . . . ) allowing the phase difference E between the filtering result (Wy) generated from the reference signal (Wx) and the vibration signal extracted by the vibration extractor 210 to be minimized using an algorithm of a recursive least square (RLS) type.

When an output disconnecting unit (not shown) such as the clutch is disposed between the first motor 112 and the engine 114, the filter coefficient updater 233 may stop the coefficient update when the output is disconnected by the clutch, and perform the coefficient update only when the output is connected.

Next, the phase determiner 240 calculates the speed signal (W1m) by differentiating the rotation angle (θm1) of the first motor 112 measured by the position measurer 221, and determines a phase difference (θd) between the reference signal (Wx) generated by the reference signal generator 220 and the vibration signal (Wd) extracted by the vibration extractor 210 using the calculated speed signal (W1m) and the coefficient determined by the coefficient determiner 230 (504). The phase determiner 240 includes a speed calculator 241 calculating the speed signal (W1m) by differentiating the rotation angle (θm1) of the first motor 112 measured by the position measurer 221, and a phase determiner 242 detecting the phase difference (θd) between the reference signal (Wx) generated by the reference signal generator 220 and the vibration signal (Wd) extracted by the vibration extractor 210 using the speed signal (W1m) calculated by the speed calculator 241 and the coefficient determined by the coefficient determiner 230. Here, the phase determiner 242 may determine the phase difference (θd) as in the following Equation 2. Here, w corresponds to angular speed, and Ts corresponds to a time.

$$\theta_d = \angle H(e^{j\omega T_s}) = \tan^{-1}\frac{-b_1\sin(\omega T_s)}{b_0 + b_1\cos(\omega T_s)} \quad [\text{Equation 2}]$$

Next, the phase deviation amount detector 250 detects a compensation value (θp) for compensating for a phase difference according to a transfer delay from the vibration extractor 213 (or the vibration extractor 210) to the first motor 112 using the speed signal (W1m) of the first motor 112 (505). In addition, the phase deviation amount detector 250 may also further detect a compensation value (θv) for compensating for a phase delay generated by the vibration extractor 213. Here, the phase delay means the phase delay generated by the vibration extractor 213, that is, the band-pass filter.

Next, the synchronization signal generator 260 generates an antiphase signal using the phase (θ1m2) generated by the generator 222 of the reference signal generator 220, the phase (θd) detected by the phase determiner 240, and the compensation values (θp/θv) detected by the phase deviation amount detector 250 (506). According to the present disclosure, the synchronization signal generator 260 may particularly improve the phase synchronization performance between the actual vibration and the reference signal by generating the antiphase signal in the shape of the actual vibration, not in the sine wave of the sine form used for the typical active vibration reduction technology based on phase information (θ1m2) of the first motor 112 from the reference signal generator 220.

Next, the torque generator 270 generates vibration reduction torque by generating antiphase torque by multiplying the antiphase signal generated by the synchronization signal generator 260 with reference torque T determined by an amplitude ratio determiner 271 by a multiplier 272, and then summing the antiphase torque and instruction torque by a summer 273 (573). The compensating force occurs at the target portion (e.g., the first motor) based on the vibration reduction torque. Here, the reference torque may also be a preset constant, may also be a constant ratio of engine torque or a total of torque applied to the powertrain, and may also be a value obtained by multiplying the engine torque or a total of torque applied to the powertrain with an amplitude ratio in a frequency domain. The instruction torque may be instruction torque from a high-level control unit (e.g., the hybrid control unit 124 or an accelerator pedal (not shown)).

Figure 6:
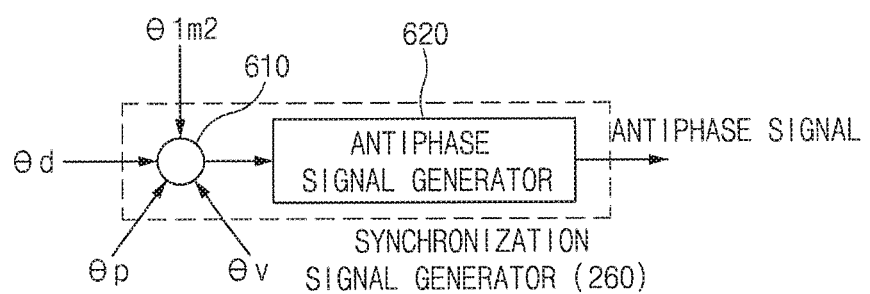
FIG. 6 is a view illustrating a synchronization signal generator 260 according to an exemplary embodiment of the present disclosure.

FIG. 6 is a view illustrating a synchronization signal generator 260 according to an exemplary embodiment of the present disclosure.

Referring to FIG. 6, the synchronization signal generator 260 according to an exemplary embodiment of the present disclosure includes a phase synthesizer 610 and an antiphase signal generator 620.

According to the present disclosure, when the reference signal generator 220 generates a change phase (θ1m2) to which a multiple of a period of an explosion of the engine is applied according to the phase information of the first motor 112, the phase synthesizer 610 generates a signal obtained by appropriately synthesizing the phases in order to reflect the phase (θ1m2) and several compensation phases (θd, θp/θv), and the antiphase signal generator 620 generates an antiphase (e.g., a phase difference of 180°) signal of the corresponding phase synthesizing signal (see FIG. 3).

For example, the phase synthesizer 610 generates the phase synthesizing signal corresponding to the shape of the actual vibration according to a phase obtained by adding the compensation value (θp) detected by the phase deviation amount detector 250 to a result obtained by subtracting the phase (θd) detected by the phase determiner 240 from the phase (θ1m2) generated by the reference signal generator 220. Here, the phase synthesizer 610 may also generate the phase synthesizing signal corresponding to the shape of the actual vibration by further adding the compensation value (θv) for compensating for the phase delay generated by the vibration extractor 213. The antiphase signal generator 620 generates the antiphase (e.g., a phase difference of 180°) signal of the corresponding phase synthesizing signal.

Figure 7:
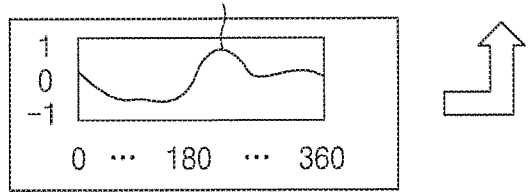
FIG. 7 is a view illustrating an example of a lookup table for generating a phase synthetic signal corresponding to a shape of actual vibration according to the present disclosure.

As an example, in order to generate the phase synthesizing signal corresponding to the shape of the actual vibration using the phase information (θ1m2, θd, θp/v) as described above, a look-up table (LUT) for signal amplitude (e.g., between −1 and 1) for each of phase values (e.g., synthesizing phases) may be used as illustrated in FIG. 7. For example, the actual vibration is measured after starting-on the engine and the signal amplitude for each of predetermined phase values (e.g., the synthesizing phases) to be matched to the shape of the actual vibration is measured and is pre-stored in the look-up table, thereby making it possible to use the pre-stored signal amplitude to generate the phase synthesizing signal for the phase (e.g., the synthesizing phase) determined using the phase information (θ1m2, θd, θp/θv). The phase synthesizer 610 may calculate the signal amplitude corresponding to a detailed phase between phase values of the look-up table by a linear interpolation method, and may also use the calculated signal amplitude, in order to generate a precise phase synthesizing signal.

Figure 8A:
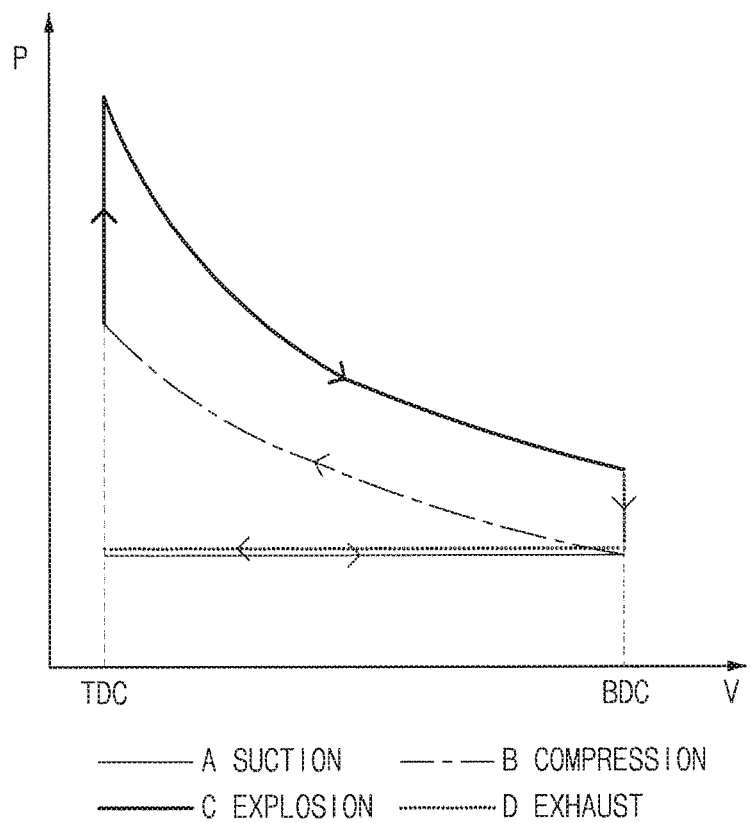
FIG. 8A is a view for calculating the phase synthetic signal corresponding to the shape of the actual vibration according to the present disclosure.
Figure 8B:
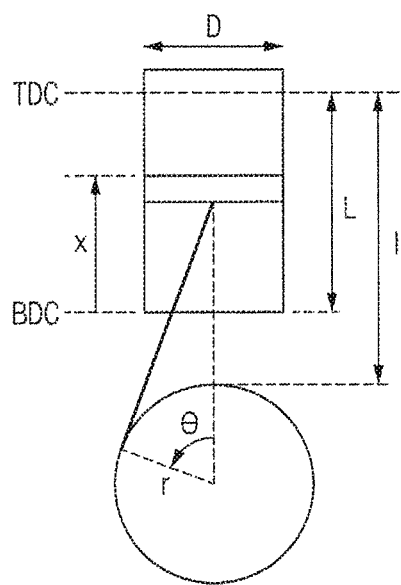
FIG. 8B is a view illustrating a method using an engine modeling for generating the phase synthetic signal corresponding to the shape of the actual vibration according to the present disclosure.

As another example, in order to generate the phase synthesizing signal corresponding to the shape of the actual vibration using the phase information (θ1m2, θd, θp/θv) as described above, engine or crank shaft torque models associated with suction, compression, explosion, and exhaust strokes of a vehicle system having a target engine may be used as illustrated in FIGS. 8A and 8B. Since typical engine or crank shaft torque model are well known, a description thereof will be briefly provided as follows.

For example, for an engine vehicle having a predetermined cylinder (e.g., 4, 6, 8, 14 etc.), the phase synthesizer 610 may calculate and output the phase synthesizing signal corresponding to the shape of the actual vibration using the phase information (θ1m2, θd, θp/θv) as described above, based on the engine or crank shaft torque model considering a cylinder stroke L, an inner diameter D of a piston, a connecting rod length l, a piston position x, a compression ratio c, an atmospheric coefficient (a=103.25 kN/m$^2$), a rotation angle (θ) of the crank shaft, a radius r of the crank shaft, and the like, as illustrated in FIG. 8A. Here, as illustrated in FIG. 8B, in an otto cycle pressure-volume (P-V) diagram, information such as the piston position x, a cylinder volume V, a cylinder pressure (e.g., P=1/V), torque of the crank shaft, engine torque, a pressure or rotation angle (e) range for each of the strokes, and the like associated with the suction, compression, explosion, and exhaust strokes of the engine may be used.

Figure 9:
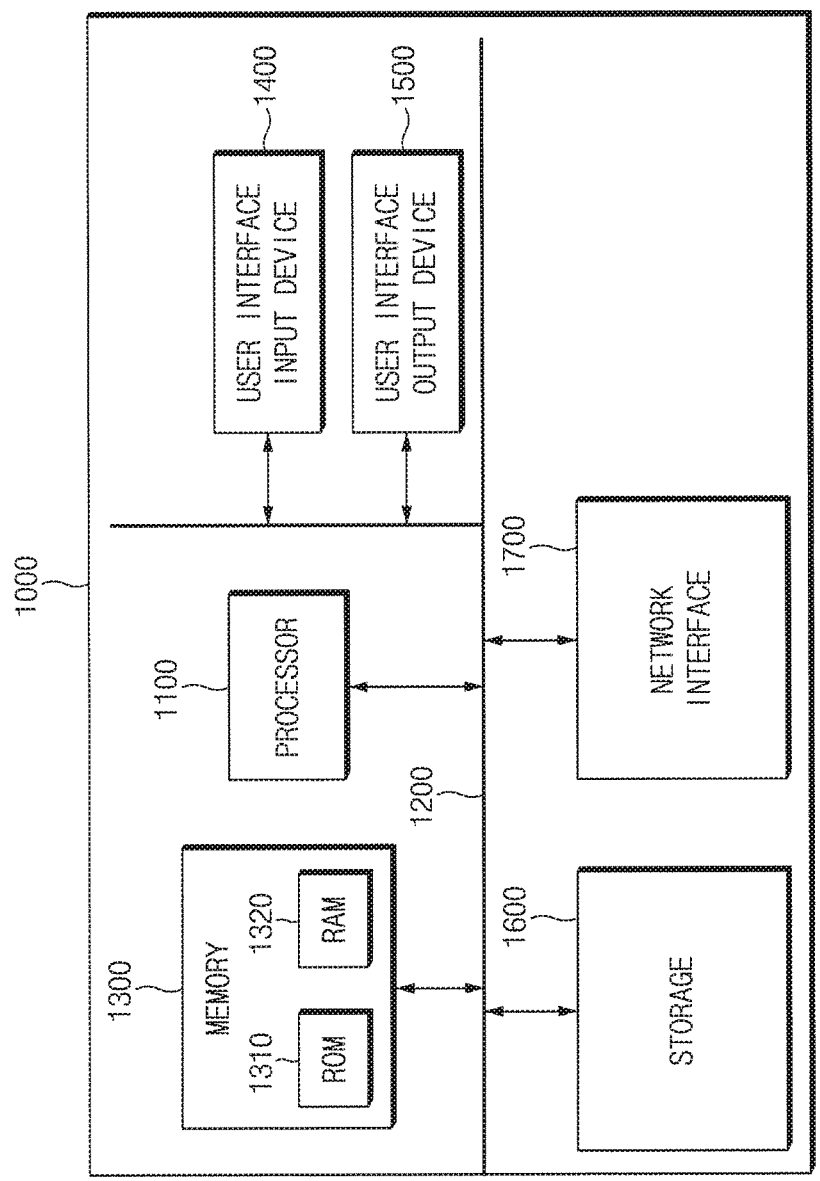
FIG. 9 is a view illustrating an example of a method of implementing an active vibration reduction control apparatus for a hybrid electric vehicle according to an exemplary embodiment of the present disclosure.

FIG. 9 is a view illustrating an example of a method of implementing an active vibration reduction control apparatus 500 for a hybrid electric vehicle according to an exemplary embodiment of the present disclosure. The active vibration reduction control apparatus 500 for a hybrid electric vehicle according to an exemplary embodiment of the present disclosure may be implemented by hardware, software, or a combination thereof. For example, the active vibration reduction control apparatus 500 for a hybrid electric vehicle may be implemented by a computing system 1000 as illustrated in FIG. 9.

The computing system 1000 may include at least one processor 1100, a memory 1300, a user interface input 1400, a user interface output 1500, a storage 1600, and a network interface 1700 which are connected through a bus 1200. The processor 1100 may be a central processing unit (CPU) or a semiconductor device executing processes for instructions which are stored in the memory 1300 and/or the storage 1600. The memory 1300 and the storage 1600 may include various kinds of volatile or non-volatile storing media. For example, the memory 1300 may include a read only memory (ROM) 1310 and a random access memory (RAM) 1320.

Accordingly, steps in the method or algorithm which is described in connection with the exemplary embodiments disclosed in the present specification may be directly implemented in hardware, a software module, or a combination thereof which is executed by the processor 1100. The software module may be resided on a storing medium (i.e., the memory 1300 and/or the storage 1600) such as a random access memory (RAM) memory, a flash memory, a read only memory (ROM) memory, an erasable programmable read only memory (EPROM) memory, an electrically erasable programmable read only memory (EEPROM) memory, a register, a hard disk, a removable disk, or a compact disc-read only memory (CD-ROM). An illustrative storing medium may be coupled to the processor 1100 and the processor 1100 may read information from the storing medium and write the information into the storing medium. Alternatively, the storing medium may also be integral with the processor 1100. The processor and the storing medium may also be resided within an application specific integrated circuit (ASIC). The ASIC may also be resided within a user terminal. Alternatively, the processor and the storing medium may also be resided within the user terminal as an individual component.

As described above, according to the exemplary embodiments of the present disclosure, the active vibration reduction control apparatus for a hybrid electric vehicle and the method thereof may determine the motor compensating force of the motor of the antiphase so that the phase synchronization performance between the actual vibration and the reference signal is improved by generating the reference signal of antiphase torque in the shape of the actual vibration, not in the sine wave of the sine wave form, and may actively and effectively reduce the vibration generated by the explosion of the engine by directly adjusting the phase in the frequency domain, not in the time domain.

Further, by determining the filter coefficient which is close to the optimum so that the error between the target signal and the reference signal is minimized using the adaptive filter of a finite impulse response form, an infinite impulse response form, or the like, the phase synchronization performance between the actual vibration and the reference signal may be improved, and the vibration generated by the explosion of the engine may be effectively reduced.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An active vibration reduction control apparatus for a hybrid electric vehicle, the active vibration reduction control apparatus comprising:
   a reference signal generator generating a reference signal and a first phase based on a first rotational angle of a first motor which is coupled to one side of an engine;
   a vibration extractor extracting a vibration signal from a second motor which is coupled to another side of the engine;
   a coefficient determiner determining a filter coefficient which minimizes a phase difference between the reference signal and the vibration signal;
   a phase determiner detecting a second phase which corresponds to the phase difference between the reference signal and the vibration signal using a first speed signal of the first motor and the filter coefficient;
   a phase deviation amount detector detecting a third phase for compensating for a phase delay using the first speed signal of the first motor; and
   a synchronization signal generator generating an antiphase signal of a shape of an actual vibration, using the first phase, the second phase, or the third phase using a look-up table for signal amplitude for each of phase values, in order to determine a compensating force of the first motor.

2. The active vibration reduction control apparatus according to claim 1, further comprising a torque generator generating a vibration reduction torque by generating an antiphase torque by multiplying a reference torque with the antiphase signal and then summing the generated antiphase torque and an instruction torque.

3. The active vibration reduction control apparatus according to claim 1, wherein the synchronization signal generator includes:
   a phase synthesizer generating a phase synthesizing signal corresponding to the shape of the actual vibration according to a phase obtained by adding the third phase to a result obtained by subtracting the second phase from the first phase; and
   an antiphase signal generator generating an antiphase signal of the phase synthesizing signal.

4. The active vibration reduction control apparatus according to claim 1, wherein the synchronization signal generator calculates signal amplitude corresponding to a detailed phase between the phase values of the look-up table using a linear interpolation method.

5. The active vibration reduction control apparatus according to claim 1, wherein the synchronization signal generator calculates and outputs the antiphase signal of the shape of the actual vibration using the first phase, the second phase, or the third phase, based on an engine or crank shaft torque model which is associated with suction, compression, explosion, and exhaust strokes of the engine.

6. The active vibration reduction control apparatus according to claim 1, wherein the vibration extractor includes:
a position measurer measuring a second rotational angle of the second motor;
a speed calculator calculating a second speed signal by differentiating the second rotational angle; and
a vibration extractor extracting a vibration signal by filtering the second speed signal calculated by the speed calculator.

7. The active vibration reduction control apparatus according to claim 1, wherein the reference signal generator includes:
a position measurer measuring the first rotational angle of the first motor;
a calculator calculating a third rotational angle by multiplying the first rotational angle of the first motor measured by the position measurer with a reference value as the second phase; and
a reference signal generator generating the reference signal using the third rotational angle.

8. The active vibration reduction control apparatus according to claim 7, wherein the phase determiner includes:
a speed calculator calculating the first speed signal by differentiating the first rotational angle measured by the position measurer; and
a phase determiner detecting the phase difference between the reference signal and the vibration signal using the first speed signal and the determined filter coefficient.

9. The active vibration reduction control apparatus according to claim 1, wherein the coefficient determiner includes:
a filter coefficient updater;
a variable filter filtering the reference signal generated by the reference signal generator using the filter coefficient updated by the filter coefficient updater; and
a phase difference calculator calculating the phase difference between the reference signal generated by the reference signal generator and the vibration signal extracted by the vibration extractor, and
the filter coefficient updater updates and calculates the filter coefficient so that the phase difference calculated by the phase difference calculator is minimized.

10. An active vibration reduction control method for a hybrid electric vehicle, the active vibration reduction control method comprising steps of:
generating, by a reference signal generator, a reference signal and a first phase based on a first rotational angle of a first motor which is coupled to one side of an engine;
extracting, by a vibration extractor, a vibration signal from a second motor which is coupled to another side of the engine;
determining, by a coefficient determiner, a filter coefficient which minimizes a phase difference between the reference signal and the vibration signal;
detecting, by a phase determiner, a second phase corresponding to the phase difference between the reference signal and the vibration signal using a first speed signal of the first motor and the filter coefficient;
detecting, by a phase deviation amount detector, a third phase for compensating for a phase delay using the first speed signal of the first motor; and
generating, by a synchronization signal generator, an antiphase signal of a shape of an actual vibration, using the first phase, the second phase, or the third phase using a look-up table for signal amplitude for each of phase values, in order to determine a compensating force of the first motor.

11. The active vibration reduction control method according to claim 10, further comprising a step of generating a vibration reduction torque by generating an antiphase torque by multiplying a reference torque with the antiphase signal and then summing the generated antiphase torque and an instruction torque.

12. The active vibration reduction control method according to claim 10, wherein the step of generating the antiphase signal includes:
generating a phase synthesizing signal which corresponds to the shape of the actual vibration according to a phase obtained by adding the third phase to a result obtained by subtracting the second phase from the first phase; and
generating an antiphase signal of the phase synthesizing signal.

13. The active vibration reduction control method according to claim 10, wherein in the step of generating the antiphase signal, signal amplitude corresponding to a detailed phase between the phase values of the look-up table is calculated using a linear interpolation method.

14. The active vibration reduction control method according to claim 10, wherein the step of generating the antiphase signal includes: calculating and outputting the antiphase signal of the shape of the actual vibration using the first phase, the second phase, or the third phase, based on an engine or crank shaft torque model which is associated with suction, compression, explosion, and exhaust strokes of the engine.

15. The active vibration reduction control method according to claim 10, wherein the step of extracting the vibration signal includes:
measuring a second rotational angle of the second motor;
calculating a second speed signal by differentiating the second rotational angle; and
extracting a vibration signal by filtering the second speed signal.

16. The active vibration reduction control method according to claim 10, wherein the step of generating the reference signal and the first phase includes:
measuring the first rotational angle of the first motor;
calculating a third rotational angle by multiplying the first rotational angle of the first motor with a reference value as the first phase; and
generating the reference signal using the third rotation angle.

17. The active vibration reduction control method according to claim 16, wherein the step of detecting the second phase includes:
calculating a first speed signal by differentiating the first rotational angle of the first motor; and
detecting the phase difference between the reference signal and the vibration signal using the speed signal and the filter coefficient as the second phase.

18. The active vibration reduction control method according to claim 10, wherein the step of determining the filter coefficient includes:

filtering, by a variable filter, the reference signal using the filter coefficient;
calculating the phase difference between the reference signal and the vibration signal; and
updating the filter coefficient for the variable filter so that the phase difference between the reference signal and the vibration signal is minimized.

* * * * *